United States Patent [19]

Perry

[11] 4,350,972

[45] Sep. 21, 1982

[54] MULTIPLE CONSOLE CONTROL SYSTEM

[75] Inventor: Fred G. Perry, Lynchburg, Va.

[73] Assignee: General Electric Company, Lynchburg, Va.

[21] Appl. No.: 152,824

[22] Filed: May 23, 1980

[51] Int. Cl.[3] .................... H04Q 9/00

[52] U.S. Cl. .................... 340/825; 340/365 S

[58] Field of Search .................... 340/147 R, 365 S

[56] References Cited

U.S. PATENT DOCUMENTS 3,903,499 9/1975 Oliver .................... 340/147 LP 4,194,176 3/1980 Fukuma .................... 340/147

*Primary Examiner*—Donald J. Yusko

*Attorney, Agent, or Firm*—Larry S. Nixon

[57] ABSTRACT

A control system providing control from multiple control consoles of a circuit board fabricated device. Indicators at each control console provide users with status information so that users will not command conflicting functions of the device. The control system uses a control circuit arrangement that minimizes the number of printed wires and terminal connectors on a standardized back plane circuit board used in conjunction with the circuit board fabricated device.

27 Claims, 6 Drawing Figures

MULTIPLE CONSOLE CONTROL SYSTEM

BACKGROUND OF THE INVENTION

This invention relates generally to remote control of electrical apparatus and particularly to apparatus fabricated in circuit board arrangements. Even more specifically, this invention relates to control systems that afford multiple user control from different locations.

The background of the present invention will be more fully understood with reference to FIGS. 1-5. Referring now to FIG. 1, there is shown a basic control arrangement for controlling a device 10 by an electrical switch 12. Switch 12 is an operators control that may be located in a remote control console some distance from device 10 to be controlled. In one embodiment, device 10 performs one of N mutually exclusive functions in response to the state or position of switch 12 selected by an operator. For example, device 10 may be a radio transmitter and switch 12 may be used to select its operating channel. The transmitter is intended to transmit on only one channel at a time, hence the channel selection controlled by switch 12 is mutually exclusive.

The basic control arrangement shown in FIG. 1 includes a common line 14 coupled to a poll 16 of switch 12. The specific mutually exclusive functions of device 10 are selected by coupling poll 16 of switch 12 to one of N switch lines 18 (18-1 . . . 18-N). Switch 12 can be remotely located at an operator remote control console or control panel. A multiple wire cable interconnects switch 12 via lines 14 and 18 to device 10. Such a control arrangement is adequate for a single operator controlling device 10 from a single location.

However, if it is desired to provide a second operator's control point, switch 12 must be replaced with two switches, one for each operator. FIG. 2 illustrates an attempt to expand the arrangement shown in FIG. 1 to one affording control to two operators at different control points. The single switch of the FIG. 1 arrangement is replaced by two switches in parallel.

Referring now to FIG. 2, there is shown a multiple operator control arrangement. In this particular case, only four switch lines 18 (18-1 . . . 18-4) are shown for simplicity. However, any number of switch lines can be utilized. Common line 14 is coupled to the polls 20 and 22 of two switches 24 and 26, respectively. Each of switches 24 and 26 performs a function identical to that performed by switch 12 in FIG. 1. Switch 24 includes throws coupled one each to switch lines 18-1 . . . 18-4. Similarly, switch 26 includes throws coupled one each to switch lines 18-1 . . . 18-4. Thus, switches 24 and 26 are in parallel with one another and control can be exercised by the operator of either of these switches. Even though only two switches 24 and 26 are shown, this arrangement is naturally extendable to an even greater number of switches and operators. The problem with the arrangement shown in FIG. 2 is that multiple and conflicting control commands may be requested by different users. Such a situation is illustrated by the switch positions illustrated in the figure. As illustrated in FIG. 2, switch 24 shows its poll 20 coupled to switch line 18-1, while switch 26 shows its poll 22 coupled to switch line 18-3. If device 10 to be controlled were a radio transmitter, and switches 24 and 26 were channel select switches, the transmitter would be receiving conflicting commands to transmit on the frequencies designated by both switch line 18-1 and switch line 18-3. Such an arrangement is unacceptable for obvious reasons. One approach to overcome the difficulties associated with the FIG. 2 control arrangement is illustrated by FIG. 3.

Referring now FIG. 3, there is shown a control arrangement providing multiple operator control of device 10. The arrangement shown in FIG. 3 solves the problem of conflicting commands from multiple operator controls. In this arrangement, the contacts of each of rotary switches 24 and 26, shown in FIG. 2, are replaced by momentary action switches 30 and 32 respectively. Momentary action switches 30 include switches 30-1 . . . 30-4, and momentary action switches 32 include switches 32-1 . . . 32-4. Each of momentary action switches 30 couples common line 14 to one of switch lines 18-1 . . . 18-4. Similarly, each of momentary action switches 32 couples common line 14 to one of switch lines 18-1 . . . 18-4. Thus, each of momentary action switches 30 is in pallel with its corresponding momentary action switch 32, i.e., switch 30-1 is in parallel with switch 32-1, etc.

Memory elements 36-1 . . . 36-4 are interposed along switch lines 18-1 . . . 18-4, respectively between switches 30 and 32 and device 10. Memory element 36-1 is interposed along switch line 18-1, memory element 36-2 is interposed along switch 18-2, etc. The load and store function of all of memory elements 36 is controlled by a memory control line 38. The term Load means to acquire new information and the term Store means to retain information previously acquired. Memory elements 36 are shown schematically and are intended to include a wide variety of memory elements, depending upon the particular application in which they are utilized. For example, memory elements 36 may be latching relays, in which case the load/store function would be referred to as latch/unlatched function. For electronic applications, memory elements 36 might be flip-flops. In such cases, the load/store function would be referred to as set/reset. For the purposes of the present discussion, all such specific implementations for memory elements 36 are considered to be identical. A control circuit 40 controls the load/store function of memory elements 36 by impressing the appropriate signal onto memory control line 38. Control circuit 40 is coupled to each of switch lines 18 and detects the presence of a closure from any of switches 30 and 32. Upon detecting a switch closure, control circuit 40 causes memory elements 36 to reacquire the status of the signals at their respective inputs, i.e., the signals on switch lines 18.

If a first operator at a control console including momentary action switches 30 desires to implement a different function than the function currently in use, he simply actuates the appropriate switch 30. Control circuit 40 detects the actuation and causes memory elements 36 to cycle through their load function. This establishes a new control signal which is transmitted to device 10 via lines 42 (42-1 . . . 42-4) coupling the outputs of memory elements 36 to control inputs of device 10. Any previous command is automatically lost or reset since all memory elements 36 are cycled to reacquire the status of the signal coupled thereto, and since switches 30 and 32 are momentary acting switches and which do not remain in constant contact with their respective switch lines. In essence, a switch line closure which is momentary on lines 18 is maintained constant on lines 42 by the action of memory elements 36. An operator at a control console including momentary action switches 32 can similarly change the previously implemented function for device 10.

When the control arrangement shown in FIG. 3 is applied to electronic circuits fabricated in circuit board arrangements, it has distinct disadvantages. In order to better understand these disadvantages, reference is made to FIGS. 4 and 5.

Referring now to FIG. 4, there is shown a typical circuit board implementation of the control arrangement shown in FIG. 1. A common method of packaging complex electronic systems is to partition the system into smaller segments or subsystems. Each subsystem is manufactured on its own circuit board. The various circuit board are mounted in a card cage. The circuit boards themselves plug into edge connector sockets on a back plane circuit board, also known as a mother board. Circuitry on the back plane board interconnects the other circuit boards attached thereto.

Specifically, in FIG. 4, a device 10 to be controlled, such as a radio transmitter, is fabricated on a device circuit board 50. Control connections 52 on device circuit board 50 interconnect with a set of terminals 54 on a back plane circuit board 58. Back plane circuit board 58 includes a set of wires 56 (56-1 . . . 56-5). Wires 56 couple, one each, the terminals 54 to a set of terminals 57 also located on back plane circuit board 58. Switch 12 is remotely located and is coupled to terminals 57 via common line 14 and switch lines 18. Common line 14 and switch lines 18 are coupled through terminals 57 to their respective wires 56 on a back plane circuit board 58.

In order to provide cost effective volume production of device 10, it is desirable to manufacture a single, standardized version of the device. Most applications of the device can be handled by simple control schemes such as that shown in FIG. 1 and in FIG. 4. However, a significant portion of applications will require complex controls with two or more operator consoles. Operator consoles may not be within sight or sound of each other, in which case the various operators will not know which position switch 12 is in unless a status feedback indication is given to each console. To provide such status feedback the control arrangement illustrated by FIG. 4 must be expanded to the arrangement shown in FIG. 5.

Referring to FIG. 5, there is shown a control arrangement providing status indicators to each operator. The control arrangement shown in FIG. 5, is similar to that shown in FIG. 3. However, it includes the required interconnections for circuit board fabrication and, in addition, shows the addition of indicator lights indicating the status of the function selected by the various switches. Thus, FIG. 5 illustrates the full implications of having multiple control points implemented with the basic control arrangement illustrated by FIG. 3. An operator at a first control console can request a function change by operating one of momentary action switches 30. Similarly, the operator of a second control console can request a function change by operating one of his momentary action switches 32. A set of indicators 60 at the first control console and 62 at the second control console indicate to the operators the function presently implemented by device 10.

In this FIG. 5 arrangement, device 10 is fabricated on a device circuit board 50. A control circuit 40 and memory elements 36 are fabricated on a control circuit board 60. A back plane circuit board 62 provides the appropriate wire interconnections for device circuit board 50, control circuit board 60, and for coupling the common line 14, switch lines 18 and a set of indicator lines 64. It is assumed, for the purpose of the arrangement shown in FIG. 5, that the memory elements 36 have relatively low power output capability, and therefore buffer amplifiers 66 (66-1 . . . 66-4) couple the outputs of the memory elements to indicators 60 and 62. Buffer amplifiers 66 also isolate the lines 42 and the memory elements from any extraneous signals which might couple through the indicator lights from power source V. For a system with N functions, 3 N connections to control board 60 are required.

It is assumed that semiconductor technology is used to implement memory elements 36 as opposed to relays. If memory elements 36 are implemented by relays or other devices not requiring isolation and if device 10 is not subject to false signals coupled through the indicators via lines 42 then the amplfiers are not needed and one set of the edge connectors on back plane circuit board 62 and control circuit board 60 can be eliminated. However, even if one set of connectors were eliminated, there would still be required 2 N connections for N switch lines.

In order to implement the FIG. 3 control arrangement in circuit board construction, it is necessary to construct a special back plane board 62 different from FIG. 4 and having many additional connections. Back plane board 62 can not be used for a simple system such as that shown in FIG. 4. Furthermore, cables used to connect the control consoles with back plane board 62 must have twice the number of wires and terminals as would be required by the implementation shown in FIG. 4. Furthermore, twice the number of wires and terminals are required on back plane circuit board 62 as would be required on back plane circuit board 58 shown in FIG. 4. The indicators cannot be connected directly to the switches since the signals at the switches are momentary in nature and therefore would not provide a proper indication of system status. The number of interconnections to the control circuit board 60 is approximately 3 N where N is the number of switch lines to each of switches 30 and 32. Each such connection has associated with it the cost of a socket and other interconnecting elements. For any but the smallest number of control functions, the number of connections required on the various circuit board becomes quite large and exceeds the number of connections that can be made available on a single card. This forces the design of a much larger system or control circuit implemented on plural boards. Either alternative is quite expensive. Thus, there is a need to provide a control arrangement for use with circuit board systems that minimizes the number of interconnecting wires and terminals on a back plane circuit board, while providing all desired control functions and feedback status.

SUMMARY OF THE INVENTION

Therefore there is provided a control arrangement for remotely controlling devices. The control arrangement includes multiple control consoles. Each control console includes a set of momentary action switches and a set of indicators. The switches each couple a switch common line to one of a plurality of switch lines. The indicators are each coupled between an indicator common line and one of the switch lines.

A back plane circuit board includes a first set of terminals for connection to the switch lines, the switch common line and the indicator common line. Wires on the back plane circuit board couple the first set of terminals to a second set of terminals for connection to a device circuit board containing a device to be controlled by the control consoles.

A third set of terminals provided on the back plane circuit board are connected to the wires thereon and provide a convenient connection point to the terminals of a control circuit board. Thus the connections from the control circuit board are placed in parallel with the wires on the back plane circuit board.

The control circuit board includes a set of memory elements corresponding one each to the switch lines. The output of each memory element is coupled, through a gated amplifier, back to its input and to its respective wire on the back plane circuit board. An exclusive OR logic circuit compares the input and output of each memory element to detect the activation of a control console switch. If a memory element has an output different from its input, the gated amplifiers are gated off and the memory elements are caused to load the new information on the switch lines. The status of each memory element is fed back to all control consoles through the switch lines and indicators. Because the control circuit board is in parallel with the wires on the back plane circuit board, the number of wires and terminal connections thereon is minimized.

BRIEF DESCRIPTION OF THE DRAWINGS

Many of the attendant advantages of the present invention will readily be apparent as the invention becomes better understood by reference to the following detailed description with the appended claims, when considered in conjunction with the accompanying drawings wherein:

DETAILED DESCRIPTION OF THE PREFERRED EMBODIMENT

Figure 1:
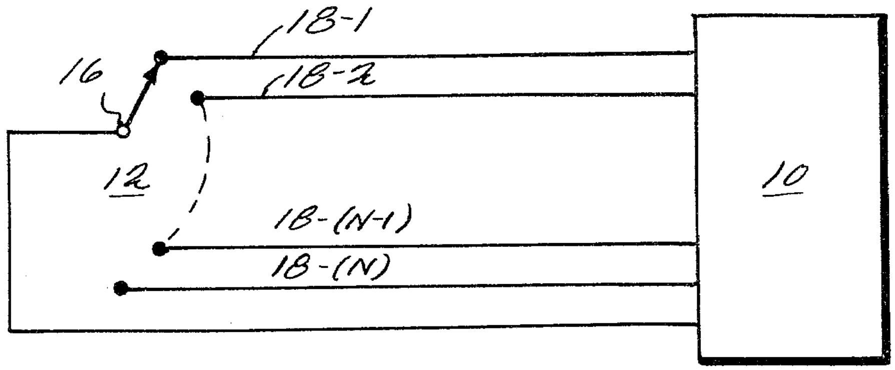
FIG. 1 (PRIOR ART)
FIG. 1 is a schematic diagram of a basic control arrangement.
Figure 2:
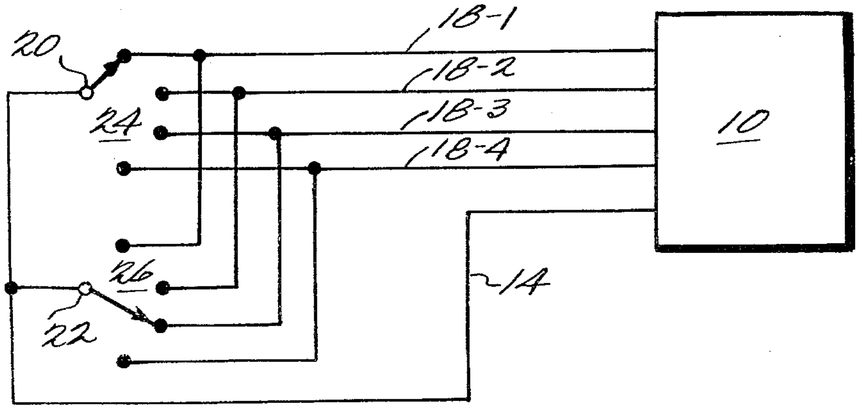
FIG. 2 (PRIOR ART)
FIG. 2 is a schematic diagram of the basic control arrangement shown in FIG. 1, extended to include two control consoles.
Figure 3:
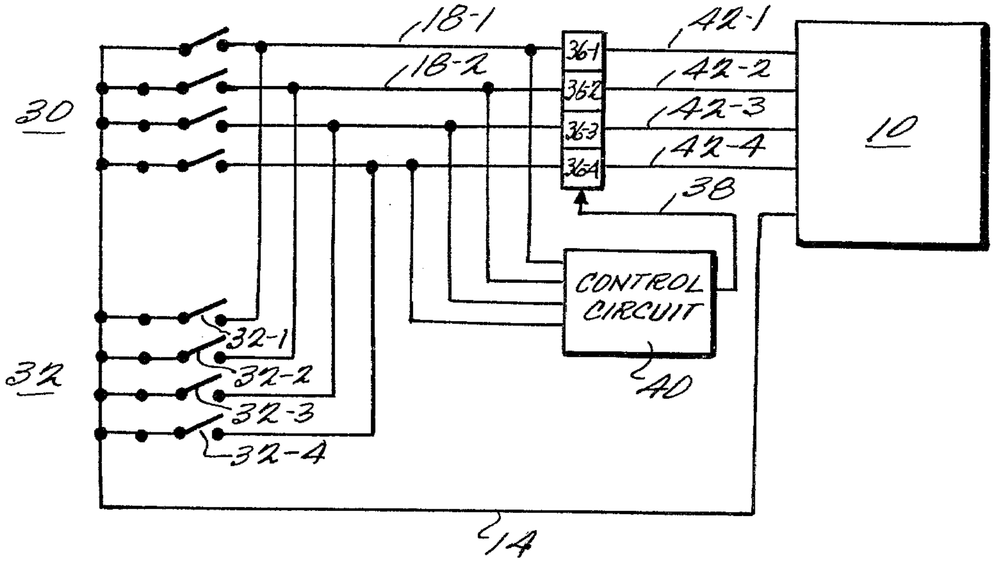
FIG. 3 (PRIOR ART)
FIG. 3 is a control arrangement providing control from multiple control consoles and preventing conflicting controls from each console.
Figure 4:
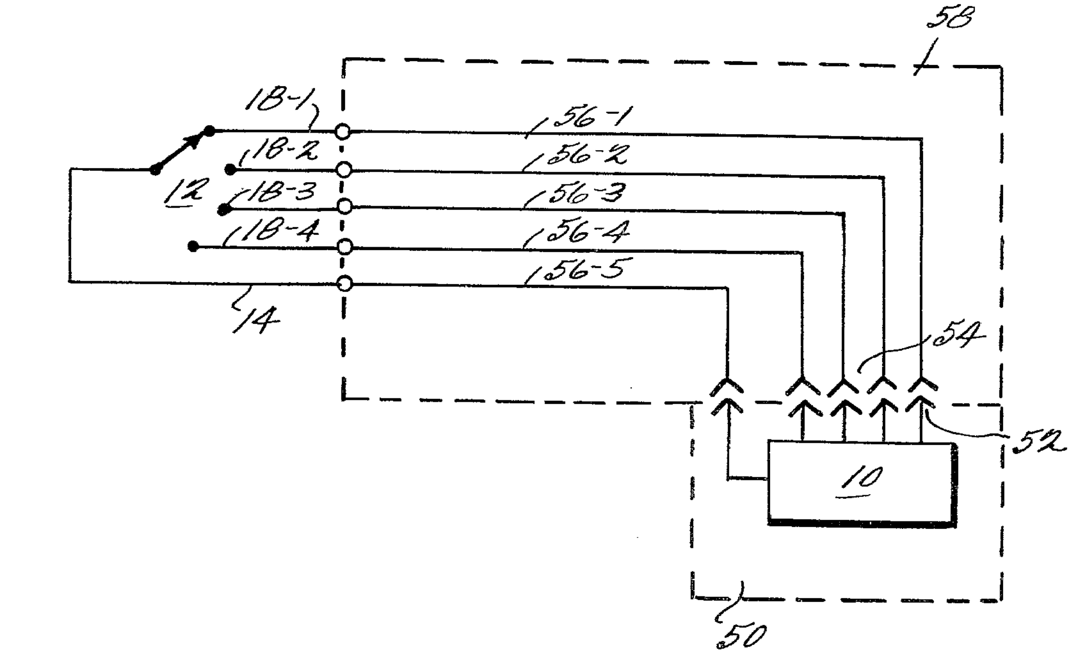
FIG. 4 (PRIOR ART)
FIG. 4 is a control arrangement for controlling circuit board fabricated devices.
Figure 5:
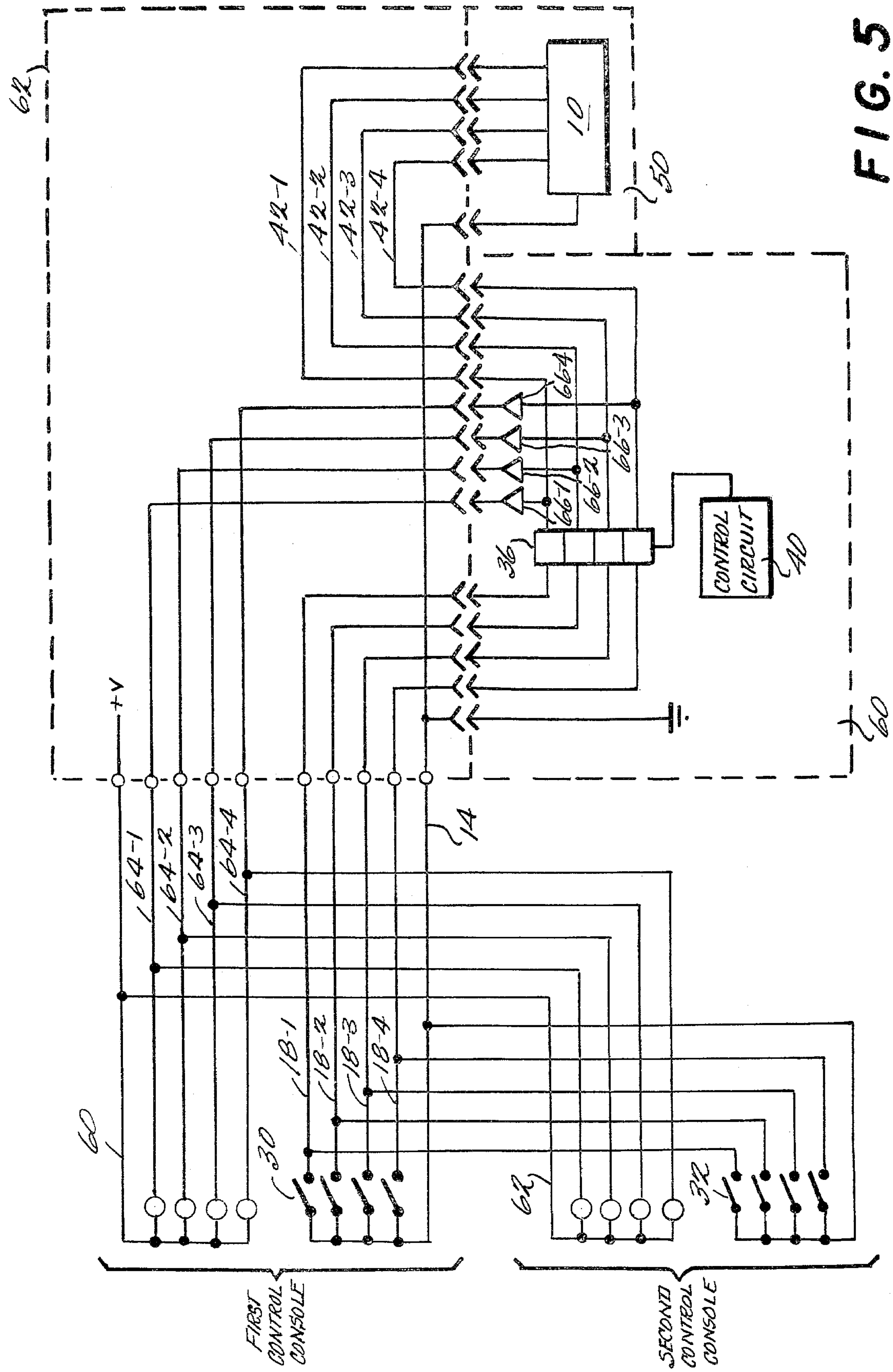
FIG. 5 (PRIOR ART)
FIG. 5 is a control arrangement having multiple control consoles and for controlling circuit board fabricated devices.
Figure 6:
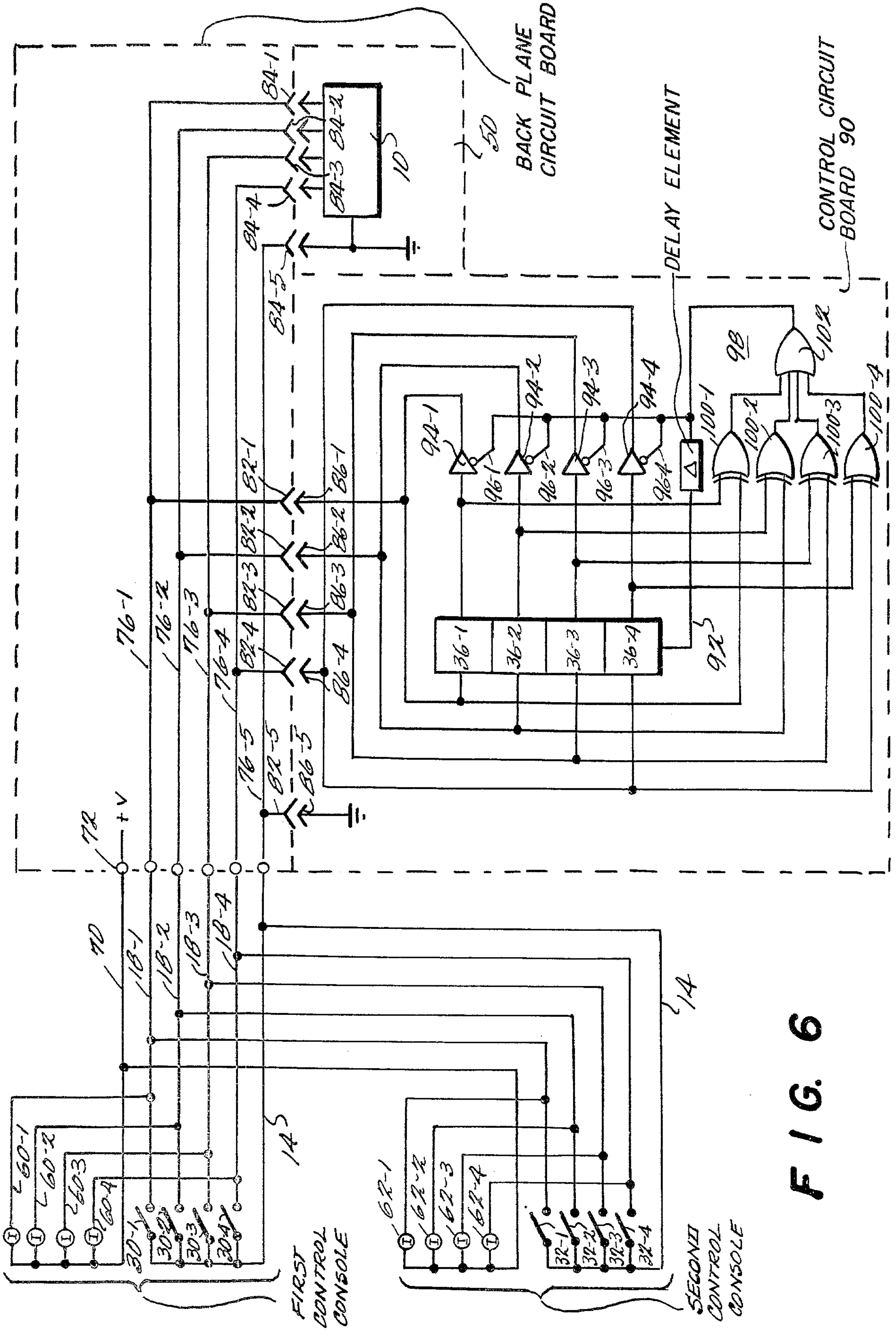
FIG. 6 is a schematic diagram of the control arrangement according to the present invention.

Referring now to FIG. 6, there is shown a schematic diagram of the control arrangement according to the present invention. As in the prior art arrangement shown in FIG. 5, a device 10 to be controlled, is fabricated on a device circuit board 50. Device 10 is capable of a number of mutually exclusive selectable functions. These functions are selected by operators at first and second control consoles. Switches 30, including switches 30-1 . . . 30-4, and indicators 60 include indicators 60-1 . . . 60-4 are located at the first control console. Switches 30, when actuated by an operator, momentarily connect a switch common line 14 to one four switch lines 18-1 . . . 18-4. Indicators 60-1 . . . 60-4 are coupled respectively to switch lines 18-1 . . . 18-4 and to an indicator common line 70 coupled to a power source. A second control console includes momentarily action switches 32, including switches 32-1 . . . 32-4 and indicators 62 including indicators 62-1 . . . 62-4. Indicators 62-1 . . . 62-4 are coupled to switch lines 18-1 . . . 18-4, respectively and to indicator common line 70. Switches 32-1 . . . 32-4 are coupled respectively between switch common line 14 and switch lines 18-1 . . . 18-4.

Switch lines 18-1 . . . 18-4, indicator common line 70, and switch common line 14 are coupled to a set of terminals 72 on a back plane circuit board 74. Back plane circuit board 74 includes connection to the power source for indicator common line 70. Back plane circuit board 74 further includes five lines 76-1 . . . 76-5, which are respectively coupled through terminals 72 to switch lines 18-1 . . . 18-4 and switch common line 14.

Back plane circuit board 74 includes a set of terminal connectors 82 for connecting to a control circuit board. Terminal connectors 82 includes terminal connectors 82-1 . . . 82-5 electrically connected to wires 76-1 . . . 76-5, respectively. Another set of terminal connectors 84 provides connection between back plane circuit board 74 and device circuit board 50. Terminal connectors 84 include terminal connectors 84-1 . . . 84-5 electrically connected to wires 76-1 . . . 76-5, respectively.

A control circuit board 90 includes a set of terminal connectors 86 for mating with terminal connectors 82. Terminal connectors 86 include terminal connectors 86-1 . . . 86-5. When control circuit board 90 is mechanically interconnected with back plane circuit board 74, connection between lines 76-1 . . . 76-4 and the inputs of four memory elements 36-1 . . . 36-4 are respectively established through terminal connectors 82 and 86. In the particular embodiment set forth in FIG. 6, it is assumed that memory elements 36-1 . . . 36-4 are semiconductor logic devices such as flip-flops. However, the invention is not limited thereto. Memory elements 36-1 . . . 36-4 could be latching relays or some other type of memory element. Memory elements 36 include a memory control line 92 for controlling the load/store function of the memory elements. The output of each of memory elements 36-1 . . . 36-4 is coupled back to its respective input through gated amplifiers 94 including amplifiers 94-1 . . . 94-4, respectively. Each of amplifiers 94 include a gate line 96-1 . . . 96-4. All of gate lines 96 are coupled to one another.

Control circuit board 90 also includes a logic circuit 98 including four exclusive OR gates 100-1 . . . 100-4 and an OR gate 102. Each of gates 100 includes two inputs, and is associated with one of memory elements 36. One of the inputs of each of gates 100 is coupled to the input of its respective memory element and its second input is coupled to the output of that memory element. Thus, exclusive OR gate 100-1 has a first input coupled to the input of memory element 36-1 and a second input coupled to the output of memory element 36-1. Exclusive OR gates 100-2 . . . 100-4 similarly connected to memory elements 36-2 . . . 36-4, respectively. The output of each of exclusive OR gates 100 is coupled to one of four inputs of OR gate 102. The output of gate 102 is coupled directly to gate lines 96 of amplifier 94 and is coupled through a delay 104 to memory control line 92 of memory element 36. In essence, gated amplifiers 94, exclusive OR gates 100, OR gate 102, and delay 104 form a control circuit for causing memory elements 36 to load and store.

The arrangement shown in FIG. 6, using gated buffer/isolation amplifiers 94 allows their outputs to be connected to the inputs of memory elements 36. This arrangement permits control circuit board 90 to be connected in parallel with device 10 and the switches of each control console. Referring back to FIG. 5, it can be seen that without using the arrangement according to the present invention, control circuit board 60 had to be placed in series connection between the switches and device 10. The indicator lamps in the FIG. 5 embodiment had to be connected to the output side of memory elements 36. Such output side connection causes an increased number of terminal connections at circuit board interfaces. However, in the arrangement according to the present invention, shown in FIG. 6, the number of terminal interconnections is minimized.

The control circuitry functions as follows. Amplifiers 94 isolate the output of memory elements 36 from their respective inputs. The input and output of each memory element 36 is connected to a logic gate 100 which provides from an exclusive OR function. A logic one (true) output from an exclusive OR logic gate 100 indicates that one of the memory elements has an input that is different from its output. The outputs from exclusive OR gates 100 are gated together in a non-exclusive OR function to provide a signal that is a logic one (true) when the input is different from the output for any memory element 36. This combined logic signal is used to gate amplifiers 94 and to control the memory load/store function of memory elements 36.

A small amount of delay, induced by delay 104, is provided in memory control line 92 to insure that amplifiers 94 have sufficient time to gate off during a load signal from logic circuit 98. The amount of delay required is about equal to the propagation time of signals through the circuit. If an operator stationed at either of the control consoles desires to change the selected function, he operates the appropriate switch 30 or 32. This causes one of the inputs of memory element 36 to be different from its output. This difference is recognized by logic circuit 98 and the logic circuit causes a memory cycle to be initiated in which the new signal is acquired (loaded) and the old signal is released. When the memory cycle is complete, the outputs of memory elements 36 will again be equal to their respective inputs and the load signal will disappear. When the operator releases the switch that he has pressed, the circuit remains latched in the new state called for by activation of the switch.

If required by the specific application, additional isolation between the indicators 60 and 62 and device 10 can be provided by placing isolation amplifiers on device circuit board 50. The number of terminal connections between boards would remain the same as shown in FIG. 6.

Therefore, it is apparent that there has been provided a control arrangement that minimizes the number of terminals and interconnections required when the control arrangement is utilized to control circuit board fabricated devices.

The control arrangement, according to the present invention performs the desired control function, while overcoming the disadvantages of previous circuits. A single version of a back plane circuit board can be used for both simple and more complex systems. The cable connecting the control consoles with the back plane circuit board need have only approximately N wires whereas prior circuits required about 2 N wires (exclusive of supply and ground leads). Likewise, approximately N terminals for cable connections are needed on the back plane circuit board where the old circuits required 2 N terminals. The edge connector socket for the control circuit board need have only approximately N connections as opposed to the 3 N connections required by previous circuits. Thus, implementing the controls does not force the system to become larger nor does it become necessary to break the controls into more than one printed wire board for reasons of number of pins used.

Obviously, other embodiments and modifications of the present invention will readily come to those of ordinary skill in the art having the benefit of the teaching presented in the foregoing description and drawings. For example, the preferred embodiment of the present invention, as illustrated in FIG. 6, includes only four switch lines, four switches, four indicators, and two control consoles. These numbers can be readily expanded by the inclusion of more lines, terminal interconnections, circuit board lines, memory elements, amplifiers, and gates.

Also, a relatively common practice for reducing the number of wires and connections required to control mutually exclusive functions is to encode the control signals onto fewer lines. Thus, a binary encoding scheme may be used to encode $2^M$ mutually exclusive functions onto M wires. The arrangement described here will work equally well when the inputs are encoded. The savings realized by using the new arrangement will have same ratio as described above for non-encoded controls.

it is therefore, to be understood that this invention is not to be limited only to the specific embodiments shown and that such modifications and other embodiments are intended to be included within the scope of the appended claims.

What is claimed is:

1. A control system for selectively controlling a device, said device comprising a control common line and at least one switch line, said control system comprising:

a momentary action switch coupling said control common line to said switch line;

a memory element including an input coupled to said switch line and including an output, said memory element comprising a control input selectively operable to load information from said switch line to store information previously loaded;

means for selectively coupling said output of said memory element to said input; and control means for causing said memory element to load information from said switch line while causing said means for selectively coupling to decouple said output of said memory element from the input thereof whenever the information at said input and output of said memory element are different, and for causing said memory element to store while causing said means for selectively coupling to couple said output of said memory element to said input thereof whenever the information at said input and output of said memory element are the same.

2. A control system according to claim 1 wherein said means for selectively coupling comprises a gated amplifier having an input coupled to the output of said memory element and an output coupled to the input of said memory element and to said switch line and having a control input for causing coupling and decoupling said amplifier from the output of said memory element to the input thereof.

3. A control system according to either of claims 1 or 2 wherein said control means comprises a logic circuit having a first input coupled to the input of said memory element, a second input coupled to the output of said memory element, and an output coupled to the control input said memory element for causing it to load or store, said output of said logic circuit also being coupled to the control input of said means for selectively coupling for controlling the coupling and decoupling of the output of said memory element to the input thereof.

4. A control system according to claim 3 further including a delay element coupled between the output of said logic circuit and said memory element.

5. A control system according to either of claims 1 or 2 further comprising an indicator coupled to said switch line for indicating the status of said memory element.

6. A control system according to claim 3 further comprising an indicator coupled to said switch line for indicating the status of said memory element.

7. A control system according to claim 4 further comprising an indicator coupled to said switch line for indicating the status of said memory element.

8. A control system according to either of claims 1 or 2 further including plural switches and plural switch lines, one switch line being associated with each such switch, and plural memory elements, one such memory element associated with each switch.

9. A control system according to claim 3 wherein said logic circuit comprises at least one exclusive OR gate having a first input coupled to the input of said memory element and a second input coupled to the output of said memory element.

10. A control system according to claim 9 further including a delay element coupled between the output of said logic circuit and said memory element.

11. A control system according to claim 9 further comprising an indicator coupled to said switch line for indicating the status of said memory element.

12. A control system according to claim 10 further comprising an indicator coupled to said switch line for indicating the status of said memory element.

13. A control system according to claim 8 wherein said control means comprises a logic circuit having a first set of inputs coupled to respective inputs of each of said memory elements, a second set of inputs coupled to respective outputs of each of said memory elements, and an output coupled to the control input of all of said memory elements for causing said elements to load or store, said output of said logic circuit also being coupled to the control input of said means for selectively coupling for controlling the coupling and decoupling of the output of each of said memory elements to the inputs thereof.

14. A control system according to claim 13 wherein said logic circuit comprises:

an exclusive OR gate corresponding to each of said memory elements, one input of each of said exclusive OR gates being coupled to the input of its corresponding memory element and a second input of each of said exclusive OR gates being coupled to the output of its corresponding memory element; and an OR gate having an input coupled to the output of each of said exclusive OR gates, the output of said OR gate serving as the output of said logic circuit.

15. A control device for selectively controlling a system on a device circuit board, said device comprising a device common line and at least one device switch line, said control system comprising:

a back plane circuit board having a back plane common line for coupling to said device control common line and a back plane switch line for coupling to said device switch line when said back plane circuit board and said device circuit board are jointed;

a first switch system having a switch system common line for coupling to said back plane common line, a switch system switch line for coupling to said back plane switch line, and at least one momentary switch coupling said switch system common line to said switch system switch line; and a control circuit board including a memory element having an input, an output, and a control input for controlling whether the memory element loads data from its input or maintains previously loaded data in a stored condition, means for selectively coupling the output of said memory element to the input thereof, control means coupled to the control input of said memory element and to said means for selectively coupling, and means for coupling the input of said memory element to said back plane switch line when said control circuit board is coupled to said back plane circuit board.

16. A control system according to claim 15 wherein said means for selectively coupling is a gated amplifier.

17. A control system according to either of claims 15 or 16 wherein said control means is a logic circuit having a first input coupled to the input of said memory element and a second input coupled to the output of said memory element.

18. A control system according to either of claims 15 or 16 further including a delay element coupling said control means to said means for selectively coupling.

19. A control system according to either of claims 15 or 16 further including an indicator coupled to said switch line for indicating the status of said memory element.

20. A control system according to claim 17 further including an indicator coupled to said switch line for indicating the status of said memory element.

21. A control system according to claim 18 further including an indicator coupled to said switch line for indicating the status of said memory element.

22. A control system according to claim 17 wherein said logic circuit includes at least one exclusive OR gate having a first input coupled to the input of said memory element and having a second input coupled to the output of said memory element.

23. A control system for selectively controlling a control device on a device circuit board, said device comprising a device control common line and at least one device switch line comprising, said control system comprising:

a back plane circuit board having a back plane common line for coupling to said device control common line and a back plane switch line for coupling to said device switch line when said back plane circuit board and said device circuit board are joined;

a first switch system having a switch system common line for coupling to said back plane common line, a switch system switch line for coupling to said back plane switch line, and at least one momentary switch coupling said switch system common line to said switch system switch line; and a control circuit board for coupling in parallel to said back plane common and back plane switch lines including means for sensing the actuation of said one momentary switch and providing, in response to said switch actuation, a signal on said back plane switch line for controlling said device.

24. A control system according to claim 23 wherein said switch further includes at least one indicator coupled to said switch systems switch line for indicating the status of the signal in said switch line.

25. A control system according to either of claims 23 or 24 wherein said means for sensing comprises:

a memory element having an input coupled to said back plane switch line;

means for selectively coupling the output of said memory element to both the input thereof and to said back plane switch line; and logic circuit means for sensing whether there is a difference between the information at the input and output of said memory element and for causing said memory element to load new information when there is such a difference and to store previously loaded information when there is no difference, said logic circuit means further for causing said means for selectively coupling to couple when there is no difference and to decouple when there is a difference.

26. A control system according to claim 25 wherein said logic circuit means includes an exclusive OR gate coupled to the input and output of each memory element and an OR gate having an input coupled to the output of each of said exclusive OR gates, the output of said OR gate being the output of said logic circuit means.

27. An arrangement for selectively controlling a device, said device comprising a device control common line and at least one device switch line, said arrangement comprising:

a coupling circuit, said coupling circuit comprising a control common line for coupling to said device common line and a switch line for coupling to said device switch line in response to said coupling circuit and said device being coupled together;

a first switch system having a switch system common line for coupling to said coupling circuit common line, a switch system switch line for coupling to said coupling circuit switch line, at at least one momentary switch coupling said first switch system common line to said switch system switch line; and a memory element having an input, an output, and a control input for controlling whether the memory element loads new information or previously loaded information, means for selectively coupling the output of said memory element to the input thereof, control means coupled to the control input of said memory element and to said means for seldctively coupling, and means for coupling the input of said memory element to said coupling circuit switch line in response to said memory element being coupled to said coupling circuit.

* * * * *

UNITED STATES PATENT OFFICE

CERTIFICATE OF CORRECTION

Patent No. 4,350,972 Dated September 21, 1982

Inventor(s) Fred G. Perry

It is certified that error appears in the above-identified patent and that said Letters Patent are hereby corrected as shown below:

Col. 2, line 18, cancel "pallel" and insert -- parallel --

Signed and Sealed this

*Fifteenth* Day of *March 1983*

[SEAL]

*Attest:*

GERALD J. MOSSINGHOFF

*Attesting Officer* *Commissioner of Patents and Trademarks*